US005788196A

United States Patent [19]

Forman

[11] Patent Number: 5,788,196
[45] Date of Patent: Aug. 4, 1998

[54] SUPPORT STAND FOR A CHAFING DISH

[76] Inventor: Peter A. Forman, 201 Water St., Brooklyn, N.Y. 11201

[21] Appl. No.: 721,109

[22] Filed: Sep. 26, 1996

[51] Int. Cl.[6] ............................................. A47G 23/02
[52] U.S. Cl. ...................................... 248/147; 220/252
[58] Field of Search ...................... D7/355, 362, 366; 126/33, 246, 37; 248/373, 146, 147, 9 R; 99/324; 220/252

[56] References Cited

U.S. PATENT DOCUMENTS

| 76,639 | 4/1868 | Lawrence | 220/252 |
|---|---|---|---|
| D. 365,724 | 1/1996 | Yu | D7/366 |
| 931,497 | 8/1909 | Schille | 220/252 |

*Primary Examiner*—Peter R. Brown
*Assistant Examiner*—Gerald A. Anderson

[57] ABSTRACT

A support stand with a dome-shaped cover for containing and housing a pan for holding water and/or food above a burner assembly. The stand includes an upper support ring which has an inner and outer ring and a channel integrally formed therebetween for receiving and supporting the dome shaped cover when the cover is opened or closed over the chafing dish. The support ring is formed from a single piece of metal and includes a C-shaped aperture approximately 50% around the diameter of the ring to permit the rim of the dome-shaped cover to pass freely therethrough and engage a stop which can be pivoted out of the way so that the cover can be partially or fully opened.

4 Claims, 3 Drawing Sheets

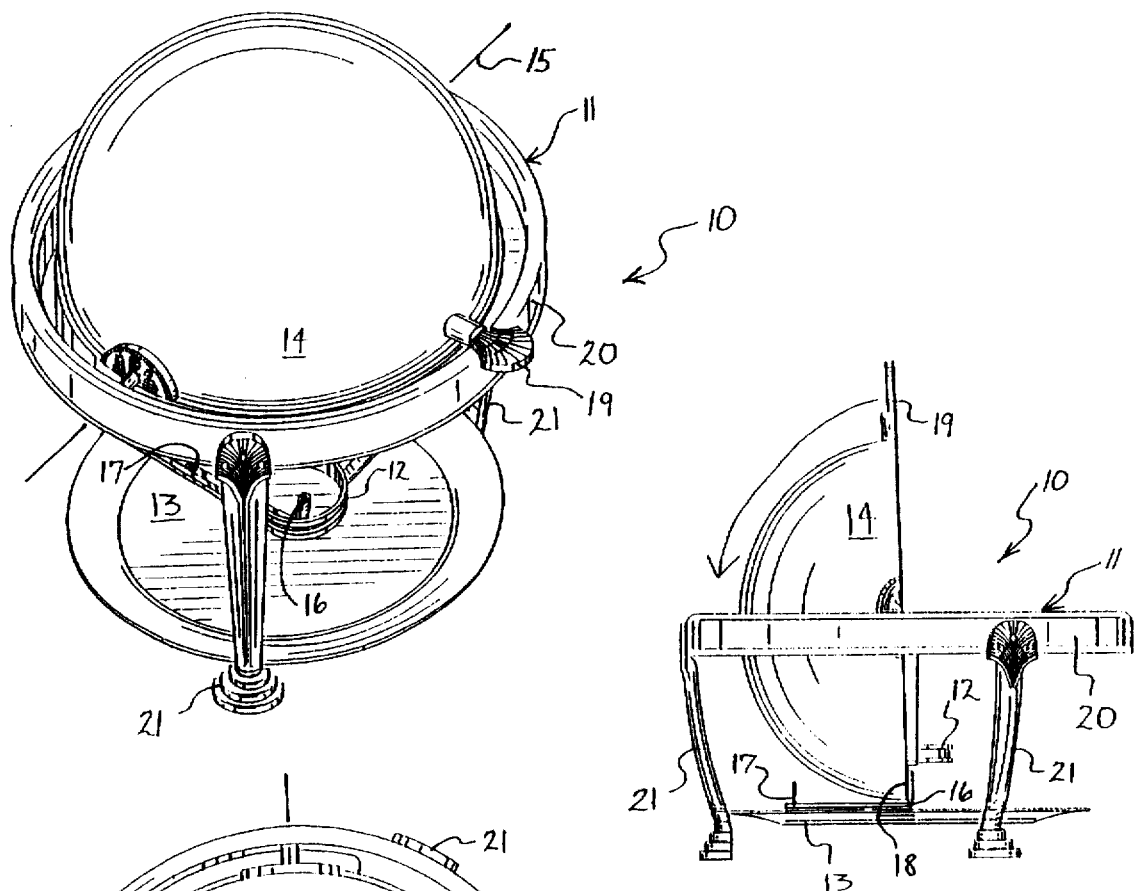
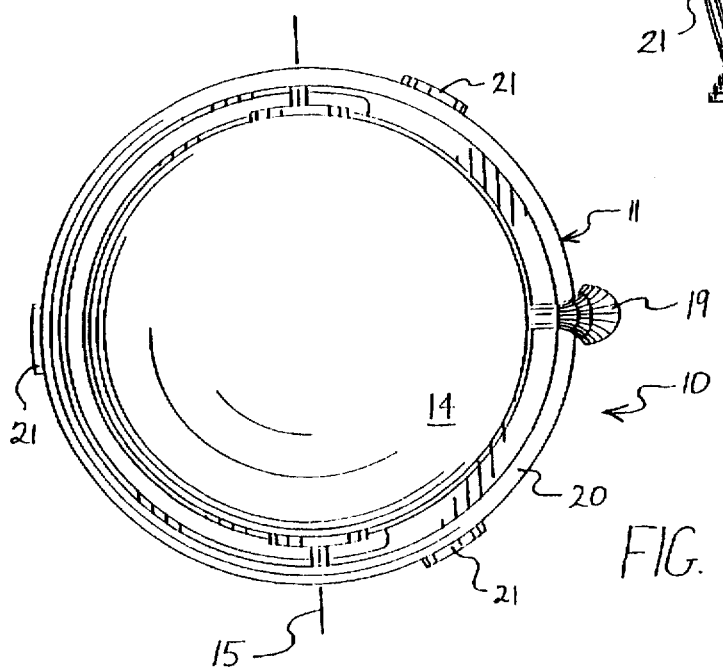

1

SUPPORT STAND FOR A CHAFING DISH

BACKGROUND OF THE INVENTION

1. Field of the Invention

The invention relates to a support stand for a chafing dish. More particularly, it relates to a support stand with an integrally-formed upper ring and a pivoting stop for selectively opening the cover.

2. The Prior Art

Chafing dishes are known according to the prior art for heating a pan with a portable burner. The portable burner permits the chafing dish to be placed in the dining room to serve food directly from the pan while it is continuously being heated. The food pan often rests in a water pan to prevent the food from being burned. Previously, the upper support ring was manufactured by spot welding a set of connecting brackets to an inner and outer ring. The inner ring is used for supporting the pan and the outer ring provides a support for the legs and the cover pivots. The space between the rings receives the dome-shaped cover or lid as it pivots open and closed. The spot welds to the outer ring require a significant expenditure of time to assemble and polish those areas smooth to maintain the aesthetic function of the outer ring. Moreover, with the prior art devices, food or liquid is able to fall through the open spaces between the inner and outer ring, thus splashing onto the serving area. Accordingly, a need exists for an improved support ring for a chafing dish.

SUMMARY OF THE INVENTION

It is therefore an object of the present invention to overcome the drawbacks of the prior art and to provide an integrally-formed upper support ring which can be easily manufactured without requiring a final time-consuming assembly and polishing step.

It is a further object of the present invention to provide a stop for the pivoting dome-shaped cover which allows the cover to be selectively opened to two different positions.

These and other related objects are achieved, according to the invention, by a support stand with a cover that supports the pan above the burner. The support stand includes an inner ring for supporting the pan and an outer ring for pivotally-supporting the cover. A horizontal channel extends radially between the inner and outer rings. A C-shaped radial aperture is formed within at least half of the channel so that the back edge of the cover or lid will pass through the radial aperture when it is opened. The channel is integrally formed with the outer and inner rings, respectively.

A lower tray is attached to the sides of the legs below the support ring and is provided with a pivoting cover stop. The cover stop selectively engages the lower rim of the cover or lid to limit the cover to a 90° rotation where the pan is to be partially covered. If the cover stop is pivoted to one side, the cover is free to open a full 180° to completely uncover the pan. When closed, the lower rim of the cover is disposed over the channel and the radial aperture.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 is a perspective view of a chafing dish showing the support stand according to the invention;

FIG. 2 is a top plan view of the chafing dish;

FIG. 3 is left side elevational view of the chafing dish with the cover pivoted open 90°;

DETAILED DESCRIPTION OF THE PREFERRED EMBODIMENT

Figure 4:
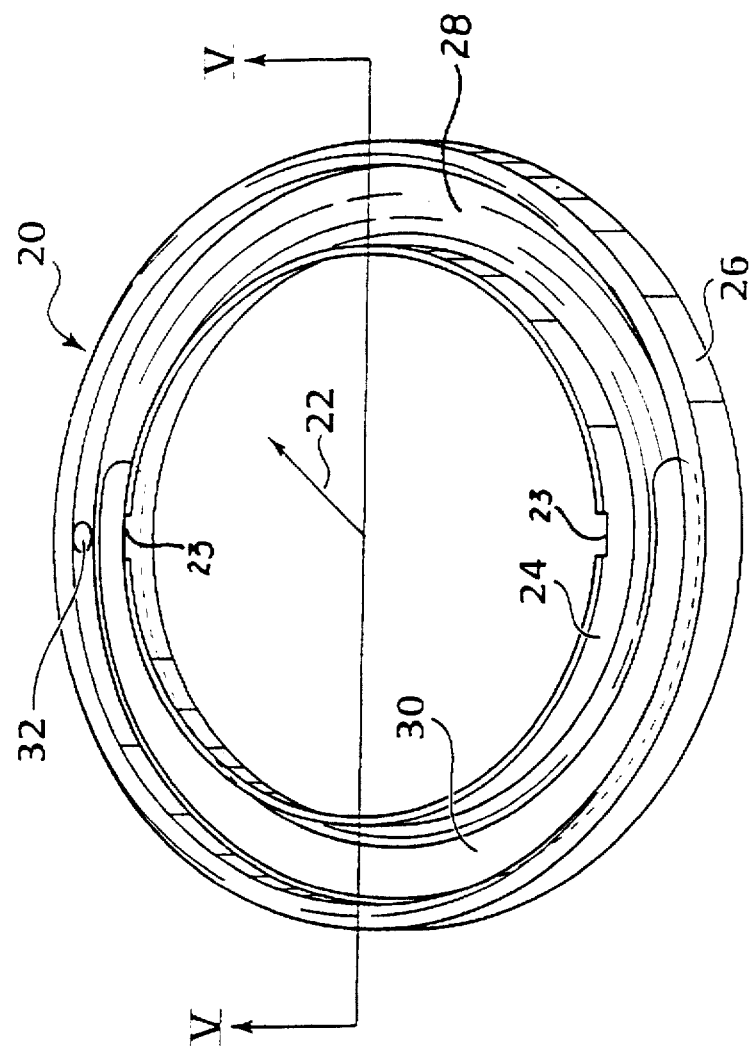
FIG. 4 is perspective view of the annular support ring.

Referring now in detail to FIGS. 1 and 2, there is shown a chafing dish 10 according to the invention having a support ring 20 disposed above a flat tray 13. Support ring 20 has three legs coupled to its sidewalls. Adjacent the bottom of each leg is an inwardly projecting step for supporting tray 13. A burner support 12 is suspended below support ring 20 and above tray 13 by means of a pair of downwardly extending straps. The free ends of these straps are coupled to the inside edges of ring 20.

A dome-shaped cover or lid 14 is pivotably mounted on ring 20 about axis 15. Mounted on the top surface of tray 13 is an L-shaped cover stop 16 which can be rotated about pivot 17 mounted in tray 13. Thus, L-shaped cover stop 16 will contact the edge of cover 14 when the cover is opened approximately 90° or halfway over the chafing dish 10, on the other hand, cover stop 16 can be pivoted out of the way from contact with the edge of cover 14 so that the dome-shaped cover will completely open and uncover the contents of chafing dish 10 without touching tray 13 or cover stop 16. Cover stop 16 preferably includes a rubber sleeve for contacting the edge of cover 14 when the cover is partially opened.

Figure 5:
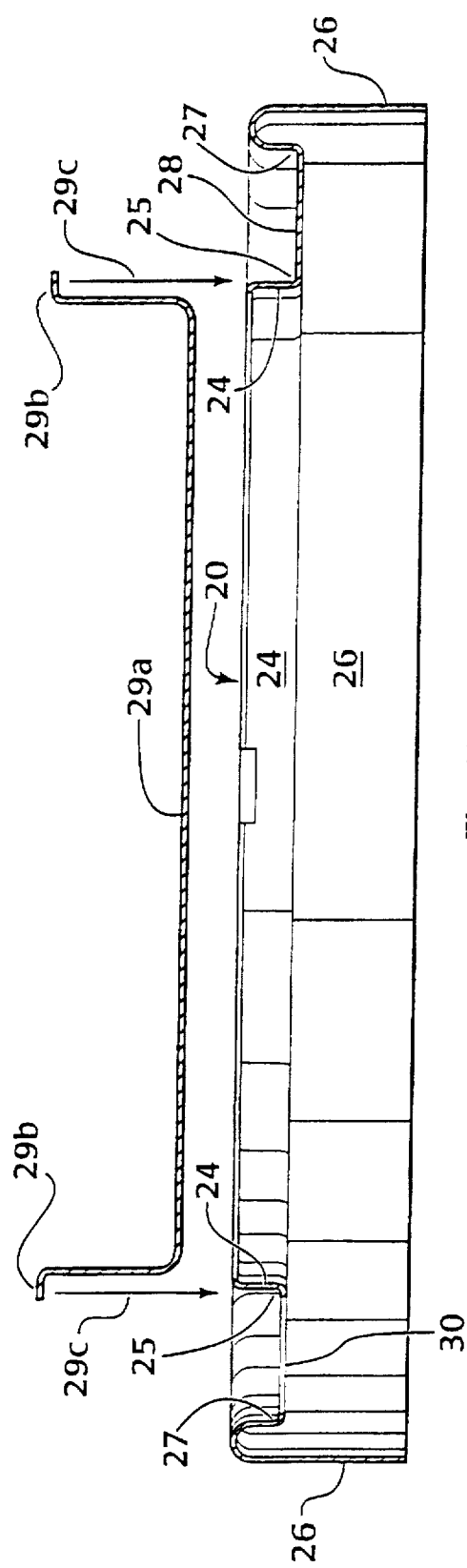
FIG. 5 is an enlarged, cross-sectional view taken along the line V—V from FIG. 4.

Support ring 20 includes three legs 21 which are bolted to the outside wall of the ring at approximately 120° apart. Support ring 20 consists of both an inner ring 24, an outer ring of larger diameter 26 integrally formed therewith and separated by a channel 28. Channel 28 includes a C-shaped aperture 30 formed between the inner and outer rings to permit cover 14 to pass through opening 30 when the cover is either partially or fully opened. Holes 32 are provided on opposite sides of ring 20 and formed within outer ring 26 adjacent to the ends of C-shaped opening 30 to permit pivot pins of cover 14 to fit therethrough and allow the cover to freely pivot on support ring 20. Outer ring 26 has a cross-sectional profile resembling an inverted J-shaped configuration and includes an inner periphery 27. Inner ring 24 has a cross-sectional profile which is substantially S-shaped with an outer periphery 25 at the lower portion thereof. The upper edge of inner ring 24 supports a flanged water and/or food pan which can be nested within the inner ring and inside cover 14. A typical water and/or food pan, as shown in FIG. 5, would have a flat bottom 29a, sidewalls 29c, and flange at the top of the sidewalls which define a shoulder that sits on top of the top edge of inner ring 24.

Support ring 20 is preferably stamped from a flat sheet of stainless steel or other suitable material. The C-shaped opening 30 may be die-cut out of the stamped support ring or pre-cut before the support ring is formed.

Legs 21 connected to the outer surface of support ring 20 are of sufficient length to allow the leading edge or rim of the water and/or food pan to pass over the top surface of tray 13 without contacting the surface of the tray. Moreover, tray 13 is mounted on legs 21 at a sufficient distance below the water and/or food pan so that the dome-shaped cover will pass closely over the top surface of the tray and engage L-shaped stop 16 when the stop is pivoted into position, as shown in FIG. 3. L-shaped stop 16 is of sufficient length with respect to pivot 17 so that it can be swiveled out of the way of the rim of dome-shaped cover 14 in order to allow the cover to fully open over the water and/or food pan, as shown in FIG. 2. The burner support and associated straps are designed to support the burner below the water and/or food pan, but a sufficient height above tray 13 in order that the rim of cover will pass below the burner without interference when the cover is completely opened.

In constructing the entire chafing dish holder, the three legs are bolted to the outer surface. The support steps of the legs which hold tray 13 may include holes (not shown) so that tray 13 can be bolted to the legs to provide additional support for both the tray and the legs. Dome-shaped cover 14 can be easily inserted into apertures 32 in the support ring without taking apart the cover's pivot pins mounted on each side thereof. Located 90° from each of the support pins on axis 15 is a decorative handle 19 forming the front portion of the cover. Handle 19 is mounted slightly above the top surface of the outer ring so that the cover can completely close over channel 28.

When the dome-shaped cover 14 is either partially or fully opened to allow the user to have access to the contents of the water and/or food pan, channel 28 serves as an apron to prevent food removed from the water and/or food pan from dropping down between the inner and outer rings, a problem with the prior art chafing dishes.

All of the parts of the chafing dish holder can be easily disassembled for cleaning by merely removing the dome-shaped cover, so that the user has access to the support ring and the tray with brushes and cleaning solutions.

Accordingly, while only one embodiment of the present invention has been shown and described, it is obvious that many changes and modifications may be made there unto without departing from the spirit and scope of the invention.

What is claimed is:

1. A stand supported on legs for holding a water and/or food pan and a dome-shaped cover above a burner assembly comprising:

a support ring having an inner ring for receiving and supporting the water and/or food pan, an outer ring concentrically disposed around said inner ring, and a connecting channel integrally formed therewith for joining the inner and outer ring together;

a C-shaped radially formed opening disposed in said channel between said inner and outer rings and opening said channel approximately halfway around the support ring;

means for receiving and pivoting the dome-shaped cover on said outer ring so that when the dome-shaped cover is closed its rim makes contact with said channel and when said cover is opened, the opposite side of said rim passes freely through said C-shaped aperture;

a tray disposed between the legs of the stand below the support ring; and an L-shaped stop disposed on the top surface of said tray for contact with the rim of said dome-shaped cover when said cover is partially opened.

2. The stand according to claim 1, additionally comprising a burner support having a pair of downwardly extending straps coupled to said support ring for containing and supporting a burner adjacent to said tray.

3. The stand according to claim 1, wherein said L-shaped stop additionally comprises a pivot coupled to said tray for permitting the stop to be pivoted free of the rim of said dome-shaped cover.

4. The stand according to claim 3, wherein said L-shaped stop additionally comprises a resilient sleeve disposed over said stop for contact with the rim of said cover.

* * * * *